United States Patent Office 2,957,927
Patented Oct. 25, 1960

2,957,927

PROCESS FOR SEPARATING NORMAL ALIPHATIC HYDROCARBONS FROM HYDROCARBON MIXTURES

Donald B. Broughton, Chicago, Herman S. Bloch, Skokie, and Richard C. Wackher, Palatine, Ill., assignors, by mesne assignments, to Universal Oil Products Company, Des Plaines, Ill., a corporation of Delaware No Drawing. Filed June 27, 1957, Ser. No. 668,327

10 Claims. (Cl. 260—676)

This invention relates to a method and a particular separating agent for segregating the normal or straight chain aliphatic components from a mixture of the same with branched chain aliphatic and/or cyclic hydrocarbons. More specifically, this invention relates to a continuous process for separating the straight chain components from a hydrocarbon mixture containing the same by a method which comprises countercurrently contacting the hydrocarbon feed stock mixture with a separating agent having the capacity of selectively sorbing normal aliphatic hydrocarbons in preference to branched chain or cyclic hydrocarbons, said separating agent comprising a slurry of solid metallo-aluminum silicate particles suspended in a liquid organic amine substantially, but not completely, immiscible with the hydrocarbon feed stock.

In one of its embodiments this invention relates to a process for separating a normal aliphatic hydrocarbon containing at least four carbon atoms from a mixture of the same with another structural class of hydrocarbon selected from the group consisting of branched chain aliphatic and cyclic hydrocarbons containing at least four carbon atoms which comprises contacting said mixture with a metallo-aluminum silicate having the capacity to selectively sorb the normal aliphatic component of said mixture and to reject said other structural class of hydrocarbon while said solid silicate is suspended in an organic amine which is substantially, but not completely, immiscible with said mixture, thereafter withdrawing a raffinate stream comprising said other structural class of hydrocarbon from a liquid slurry comprising said silicate containing sorbed normal aliphatic hydrocarbons suspended in said liquid organic amine.

A particularly effective method for separating mixtures of organic compounds based upon differences in the structure of the components within the feed stock mixture (i.e., the carbon atom skeleton of the compounds) comprises contacting the mixture of compounds with a solid sorbent comprising particles of a dehydrated zeolite synthetically fabricated from certain metallo-aluminum silicates, which, by virtue of such dehydration, contain pores having diameters of from about 4.9 to about 5.5° Angstrom units. The size of the pores in these zeolites are such that when a solid sorbent of this type, in the form of a finely divided powder or comprising granular particles of even larger size is contacted with a mixture of the organic compounds to be separated, comprising at least one component of straight chain or normal structure and at least one other component of branched chain or cyclic structure, only those compounds present in the feed stock mixture which have a straight chain configuration will be accepted or occluded within the internal structure of the solid particles of sorbent. The resulting process of separation has been referred to as "sorption" to distinguish the mechanism of occlusion observed for those sorbents from purely superficial phenomenon of adsorption which occurs with such solid adsorbents as activated alumina, silica gel, activated carbon, etc. The cross-sectional diameter of the pores present in the particles of the zeolite-type sorbent, however, are not sufficient to permit the sorption or occlusion (that is, the entry) into the internal structure of the sorbent particles of those components of the feed stock mixture having a branched chain aliphatic or cyclic structure. Because of the selectivity of these metallo-aluminum silicate or zeolite-type sorbents containing pores having the indicated diameters for the straight chain components of the feed stock mixture, as distinguished from the lack of selective sorption for the branched chain or cyclic components of the feed stock (a selectivity based upon molecular structure), these solid metallo-aluminum silicate sorbents have been referred to as "molecular sieves." Particularly suitable solid sorbents for use in the present process, selected from the above type of sorbents referred to as molecular sieves are the dehydrated aluminum silicates of the bivalent metals, such as the alkaline earth metals, for example, calcium-aluminum silicates containing various calcium to aluminum to silicon ratios, the magnesium-aluminum silicates, the barium-aluminum silicates and the strontium-aluminum silicates containing from 0.01% by weight to about 25% by weight of the alkaline earth metal; or other bivalent metallo-aluminum silicate derivatives such as the aluminum silicate derivatives of nickel, zinc, cupric copper, cadmium, and the like. One of the preferred metallo-aluminum silicate solid sorbents particularly suitable for use in the present process is calcium-aluminum silicate, prepared, for example, by coprecipitating solutions of sodium silicate and sodium aluminate to form a crystalline hydrated sodium zeolite-type aggregate, displacing at least some of the sodium with calcium in an ion-exchange operation, and thereafter, dehydrating and activating the resulting composite by heating the same to a temperature above the boiling point of water, for example, to a temperature of from about 150° C., up to about 350° C.

The usual method of employing solid sorbents for separating fluid feed stocks (that is, feed stocks present in the separation process in either vapor or liquid phase condition) comprises contacting the mixture of feed stock components, including the component to be recovered, with a fixed bed of the solid sorbent, and collecting an effluent stream comprising raffinate-type or non-sorbed components of the feed stock from a so-called "spent" sorbent comprising a combination of the solid sorbent with the component of the feed stock selectively sorbed thereby; in some cases the raffinate components is desired in as pure form as possible and thus constitutes the desired product, while in other cases, the sorbate component (the normal, preferentially sorbed component of the feed stock) is desired as the end product of the process. If the sorbed component is to be recovered, this is generally accomplished by transferring the spent sorbent to a regeneration zone, separately maintained or removed from the sorption zone, wherein the sorbed feed stock component is removed from the sorbent, for example, by distillation, displacement, etc. The regenerated solid sorbent, free of sorbed component is then generally in condition suitable for direct recycling to the sorption stage of the process. It will be noted that a process of this type has many disadvantages common to cyclic processes, such as continuous variation in the composition of the liquid streams issuing from the bed of sorbent, such that incomplete separations are realized and the product streams are more or less impure mixtures of the components present in the feed stock. Furthermore, an elaborate system of controls is required to take the appropriate cuts in each cycle of operation and large surge tanks must be provided for each effluent cut, in order to reduce fluctuation in the composition of the variation streams fed to subsequent fractional distillation equipment. A substantial simplification in plant equipment and controls could be achieved if the cyclic process could be replaced by a continuous method of contacting the sorbent with the feed stock mixture under a countercurrent flow arrangement, analogous to the conventional system of liquid-liquid countercurrent extraction.

In accordance with the process proposed in the present invention, a continuous countercurrent method of contacting a solid sorbent with the feed stock mixture is provided by suspending the solid sorbent in a relatively polar, organic liquid, maintained in liquid phase within the sorption and regeneration zones during the course of the countercurrent contact between the liquid or gaseous feed stock and the liquid suspension of solid sorbent. The success of the separation procedure effected according to the present process depends upon the specific properties of the carrier liquid utilized in the process for suspending the solid sorbent in the contacting zone. The carrier liquid must in the first instance be a polar organic liquid capable of being maintained in liquid phase at the temperature and pressure conditions provided in the sorption stage of the process. Furthermore, it must be selected from the branched chain and cyclic structural classes of compounds which will be excluded from the internal pores of the sorbent and thus resist sorption by the molecular sieve and thus remain in a free state during the separation process. The carrier for the solid sorbent must also be a liquid which is relatively immiscible with the hydrocarbon feed stock, but which, on the other hand, is sufficiently miscible therewith to effect the transfer of the normal aliphatic component or components from the hydrocarbon feed stock phase to the sorbent suspended in the organic carrier liquid. Since the polar liquid will generally preferentially wet the surface of the particles of solid sorbent (which are also polar in nature), as distinguished from the inability of the non-polar hydrocarbon phase to wet the surface of the relatively polar solid sorbent, it has been found that the liquid carrier stream will carry along the solid sorbent in suspension, with substantially no tendency of the solid sorbent to migrate into the hydrocarbon phase. Still another desired characteristic of the organic carrier liquid is that it has a boiling point which enables it to be readily separated by distillation from the sorbent and from the sorbed hydrocarbon. In addition to the foregoing qualifications, the carrier liquid must be substantially free of moisture which ordinarily is readily sorbed by the moleculer sieve and tenaciously retained thereby, even when present in small amounts in another phase, the water being preferentially sorbed by the solid sorbent, thereby deactivating the latter with respect to the desired sorption and separation of the straight chain aliphatic hydrocarbon component of the feed stock mixture. It has been found that a relatively limited number of compounds satisfies the above requirements for a suitable carrier liquid in a sorption system utilizing a molecular sieve type or sorbent, the organic compounds for this purpose being selected from the amino-substituted hydrocarbons containing a relatively large proportion of amino groups per carbon atom present within the structure of the organic carrier liquid. In order to be substantially immiscible in the hydrocarbon feed stock and to have a boiling point sufficient to be maintained in liquid phase at the temperature and pressure of operation, it has been found that the organic carrier liquid preferably contains at least one amino group for each six carbon atoms present in the compound and must contain at least six carbon atoms per molecule. Thus, aniline, 3,5-diamino-ethylbenzene, m-(alpha-aminomethyl)-aniline, ortho-, meta-, and para-phenylenediamine and other mono- and polyamines are suitable carrier liquids, whereas toluidine or phenylaminomethane are less suitable. Butylamine is not satisfactory because of its volatility at the sorption temperature and pressure, whereas the branched chain mono- and polyamino-substituted aliphatic hydrocarbon such as the di- amino-octanes, diethylenetriamine, triethylenetetramine, 1,4-diamino-5-methylheptane, 1,5-diamino-2,4-dimethylhexane, 1,6-diamino-4-methylheptane, 2,3-diamino-2,3,4-trimethylpentane, 2,4-diamino-5-methylheptane, and other mono- and polyamino-substituted alkanes containing at least six carbon atoms satisfy the requirements for a suitable organic carrier liquid in the process herein provided.

The present invention is applicable to essentially hydrocarbon feed stock mixtures, the components of which contain at least four carbon atoms per molecule and which are substantially free of moisture, low molecular weight hydrocarbons and polar compounds which tend to be readily sorbed by the molecular sieve sorbent and to occupy the internal pores of the sorbent to the exclusion of the normal aliphatic components of the feed stock mixture in the subsequent sorption stage of the process. Typical hydrocarbon mixtures utilizable as feed stocks in the present separation process are the normally liquid hydrocarbon mixtures in which at least a portion of the components are of straight chain aliphatic or of normal structure, the latter being the components of the feed stock which will be selectively sorbed by the molecular sieve contacting agent, including the normal paraffins and straight chain mono-olefins containing up to about fifteen carbon atoms per molecule, such as hydrocarbon mixtures containing n-butane, n-pentane, n-hexane, n-heptane, n-octane, n-nonane, n-decane, n-undecane, n-dodecane, etc. These hydrocarbons generally appear in admixture with branched chain aliphatic hydrocarbon isomers or with cyclic hydrocarbons, including both naphthenic and aromatic types. A particularly useful application of the present method of separation is the removal or recovery of the normal or straight chain aliphatic paraffin components from an isomerate formed, for example, by subjecting a normal paraffin hydrocarbon to an isomerization reaction. Typical of such an application of the present process, for example, is the isomerization of n-hexane with an anhydrous aluminum halide catalyst to form a mixture of n-hexane and the various branched chain hexanes. The method is particularly suited to the separation of a mixture of isomeric paraffins which boils at a constant temperature and from which the various isomers cannot generally be separated by simple distillation. Other typical feed stock mixtures may be produced, for example, in hydrocarbon reforming processes wherein feed stocks containing normal or straight chain aliphatic components are contacted with a reforming catalyst, such as a composite of platinum, alumina and a halogen such as fluorine, chlorine and/or bromine, the resulting product generally consisting of a mixture of normal paraffins, isomeric aliphatic paraffins, naphthenes, and aromatic hydrocarbons which is difficult to separate into its various component hydrocarbon classes by other separating processes. When such feed stocks are subjected to the present separation process, the normal or relatively srtaight chain paraffins and olefins, if any, present in the mixture are selectively sorbed by the present metallo-aluminum silicate sorbent, leaving an effluent raffinate comprising the branched chain and cyclic components which were present in the original hydrocarbon feed stock.

In a typical separation process utilizing the process flow herein provided and a carrier liquid for suspending the solid sorbent in its countercurrent contact with the feed stock, the mixture of hydrocarbons to be separated is generally the phase of least density present within the separation column, being charged either in liquid or gaseous phase. Because of this density relationship, compared with the relatively more dense carrier liquid phase, the feed stock is introduced into the sorption stage of the column below the entry of the carrier liquid containing the spent molecular sieve sorbent therein, and is preferably charged into the central or lower portion of the contacting section, being allowed to flow upwardly in counter-current relationship with the descending carrier liquid stream containing suspended therein the particles of solid sorbent. As the feed stock containing the normal or straight chain aliphatic hydrocarbon rises through the descending stream of solid sorbent, the normal or straight chain aliphatic components present in the feed stock becomes selectively occluded to the solid sorbent and the branched chain aliphatic and cyclic components of the feed stock are selectively excluded by the sorbent, the latter being removed from the top of the sorption zone as the present so-called "raffinate" or non-sorbed component stream. The suspension of solid sorbent, substantially spent by virtue of its occlusion of the straight chain feed stock aliphatic components therein, continues to descend in the sorption section to a level below the feed stock inlet and may be contacted at this level with a stream of substantially pure sorbate comprising the straight chain or aliphatic component recovered from the sorbent in the subsequent desorption stage of the process to displace from the suspension of spent sorbent in the carrier liquid the raffinate-type stock components which may become entrained within the stream of rich sorbent suspended in the carrier fluid. By such countercurrent displacement in the lower portion of the sorption zone, an ultimate product of greater purity may thereby be recovered in the process. This stage of the process is referred to herein as the stage of the process in which countercurrent displacement with recycle or reflux sorbate occurs. Although a stream of substantially pure sorbate is preferred as the reflux stream, any hydrocarbon stream in which the proportion of sorbate component is greater than the proportion of the same component in the feed stock mixture will effect enrichment of sorbate in the material recovered from the spent sorbent and may consequently be utilized as reflux herein. Alternatively a non-sorbed material easily separable, as by distillation, from the sorbate may be used as reflux.

The quantity of reflux required to effect substantially complete removal of the raffinate components entrained within the spent sorbent prior to effecting the recovery of sorbate from the spent sorbent will depend, of course, upon the size of the particles of sorbent, the proportion of raffinate-type components in the feed stock, the solubility of the raffinate in the sorbate-suspending medium, and on numerous other factors which affect the present separation procedure. In general, however, ratios of recycle sorbate to fresh feed volume of from about 0.1 to 1 to about 5 to 1, preferably from about 0.5 to 1 to 2 to 1, will generally remove the raffinate feed stock components from the spent sorbent phase substantially completely under the greatest latitude of variation in the physical factors involved in the entrainment of raffinate within the spent sorbent phase.

Following the countercurrent displacement or washing stage of the present separation process wherein the recycle sorbate is contacted with the spent sorbent, generally at a point farthest downstream in the sorption zone of the process, the sorbate or straight chain aliphatic components of the feed stock occluded within the spent sorbent is recovered therefrom in a so-called "desorption stage" of the process whereby not only the sorbate is recovered from the spent sorbent and removed from the process flow, but the sorbent is reinstated to a condition in which it will again accept the occlusion of straight chain components of the feed stock and in one sense, may be considered to be regenerated for recycle use in the process. The desorption stage is effected in a separate desorption zone physically set apart from the sorption stage by a suitable partitioning means when the desorption is effected within the confines of the same chamber in which the sorption stage is effected; the desorption may also be effected in a separate chamber set apart from the vessel in which the sorption stage of the process is effected. Desorption, in accordance with the present process, may be accomplished by contacting the spent sorbent from the sorption stage with a desorbing fluid, preferably under countercurrent flow conditions wherein the suspension of spent sorbent in the polar organic liquid is permitted to flow downwardly against a rising stream of the desorbent fluid introduced into the lower portion of the desorption zone. Depending upon the temperature and pressure conditions maintained within the desorption zone, various rates of flow of the desorbent may be utilized, although with a gaseous desorbent, flow rates sufficient to provide from about 0.5 to 1 to about 50 to 1 volumes of desorbent gas per volume of spent sorbent as such in the suspension of organic polar liquid, preferably from about 1 to 1 to about 10 to 1 volumes of desorbent gas per volume of spent sorbent will generally be sufficient to remove substantially completely the sorbed normal aliphatic component from the spent sorbent. In such a countercurrent flow arrangement, the desorbent gas containing vaporized sorbate is removed from the desorption zone at a point near that at which the suspension of spent sorbate in organic polar liquid is introduced into the apparatus, that is, at the top of the desorption zone. Similarly, the regenerated sorbent suspended within the organic polar liquid from which the occluded straight chain aliphatic component of the feed stock (i.e., the sorbate) is removed leaves the desorption zone at a point slightly below the point of introduction of fresh desorbent gas. The suspension of regenerated sorbent in organic polar liquid may thereafter be recycled to the top of the sorption zone to repeat the cycle of operation, thus providing a substantially continuous operation of both the sorption and desorption stages of the process herein provided. The effluent stream of desorbent gas containing vaporized sorbate and possibly vaporized polar organic liquid, when the latter is a relatively volatile material, removed as hereinabove indicated from the top of the desorption zone, may be cooled, fractionated or otherwise treated to separate the components thereof, particularly for the recovery of the normal aliphatic sorbate hydrocarbon in a substantially pure condition.

Suitable desorbent fluids utilizable in the present separation may be selected from compounds which are normally gaseous or from compounds which are liquid at the operating conditions of the present process but which differ in boiling point sufficiently from the sorbate and organic polar liquid as to be readily separable therefrom by fractional distillation. In either case, the desorbent must be a compound which is not itself occluded within the porous structure of the sorbent so tenaciously as to be removed from the sorbent only with difficulty. Suitable normally gaseous desorbents, for example, include moisture-free hydrogen, carbon monoxide, nitrogen, carbon dioxide, methane and other compounds having molecular diameters which enable the compound to be readily removed from the porous structure of the sorbent after recovery of the sorbate from the spent sorbent, for example, by vaporization therefrom. Typical normally liquid compounds suitable for use as desorbents are the normal aliphatic hydrocarbons containing at least three carbon atoms per molecule, which, however, are sufficiently volatile to be readily separated by fractional distillation from the desorbed sorbate removed in admixture with desorbent from the sorption zone. Thus, when the sorbate (i.e., the normal aliphatic component of the feed stock) is n-hexane, for example, the desorbent may be n-butane or n-pentane which can be readily separated from n-hexane by fractionation.

The present process is operated at temperature and pressure conditions which will result in the desired separation of components in the various stages of the operation. From the standpoint of economy and efficiency of operation, the sorption and desorption stages of the process are operated under substantially isothermal conditions and preferably at substantially the same temperature in all portions of the separation zone, thereby eliminating a substantial portion of the heating and pumping utilities required for the separaiton if effected at different temperatures and pressures in the sorption and desorption stages. In most instances, temperatures of from 50° to about 250° C., preferably from about 100° to about 150° C. and pressures of from 1 to about 100 atmospheres (more preferably from about 5 to about 20 atmospheres) are suitable for effecting the separation in accordance with the process herein provided. It is to be emphasized, however, that although isothermal and isobaric operation is preferred, such process limitations are not necessarily essential to the success of the operation and if more suitable, the desorption stage may be operated at a pressure and temperature different from the sorption stage.

The present invention is further illustrated with respect to several of its specific embodiments in the following examples which, however, are not intended to limit the scope of the invention necessarily in accordance therewith.

EXAMPLE I

In the following series of runs, various carrier liquids were tested to determine their effectiveness in aiding the separation between normal and isoparaffins by countercurrent contact of the feed stock in liquid phase, with a slurry (suspension) of powdered molecular sieve sorbent in the carrier liquid, the molecular sieve particles (a major proportion of which are of a size within the range of from about five to about twenty microns in diameter) having a composition corresponding to a calcium aluminosilicate (dehydrated $Ca_6(AlO_2)_{12}(SiO_2)_{12} \cdot 27H_2O$) Linde Air Products Co. Molecular Sieve 5 A.), comprising particles of porous solid having pores of approximately five Angstrom units cross-sectional diameter. The molecular sieve particles are mixed with approximately three volumes of the carrier liquid (thereby forming a slurry containing about 25% by volume of sorbent particles) and the resulting slurry allowed to flow downwardly through a contacting column containing a series of fifteen horizontal, perforated plates spaced three inches apart within a column comprising a two-inch pipe surrounded by a water jacket which maintains the internal column and its contents at a constant temperature of about 55° C. Before introducing the slurry into the column, the latter is filled with liquid feed stock, the feed thereafter being introduced at a constant flow rate, while the slurry is also charged at a constant rate into the uppermost contacting zone at the top of the column. The slurry proceeds to flow downwardly in the form of droplets through the perforated plates in each adjacent contacting zone while liquid hydrocarbon feed stock flows upwardly as a continuous phase through upcomers extending through each plate. Various organic liquids were tested as carriers for the molecular sieves and the charge stock is a mixture of various proportions of normal and isoparaffins, the specific carrier liquids utilized and the proportions of normal paraffin and isoparaffin in the charge stock being indicated in the following Table I. The carrier fluid was selected to provide a liquid having a highly branched chain or a cyclic structure, which, on the basis of observations in prior experiments, are not sorbed by the molecular sieve sorbent. The effluent hydrocarbon stream (raffinate) collected at the top of the contacting column was analyzed to determine the proportion of n-paraffin and isoparaffin in this stream. The slurry of carrier liquid and molecular sieve particles tending to collect below the lowermost plate in the contacting column is continuously charged into the top of a desorption column comprising a vertical tube of one-inch pipe surrounded by a jacket through which hot water at 55° C. is circulated. The desorbent, consisting of n-butane, is charged into the bottom of the column at the same temperature and pressure conditions maintained during the sorption cycle to thereby free the molecular sieve particles of sorbed hydrocarbon. The n-butane stream issuing from the top of the desorption column is analyzed to determine the amount and proportion of feedstock n-paraffin and isoparaffin therein. The pressure maintained in both the sorption and desorption columns is about 50 lbs./in. The results of these experiments, testing various carrier fluids, are shown in the following Table I.

Table I

SEPARATION OF NORMAL AND ISOPARAFFINS BY COUNTERCURRENT SORPTION WITH SLURRY OF CARRIER LIQUID AND MOLECULAR SIEVE SORBENTS

| Run No | 1 | 2 | 3 | 4 | 5 | 6 | 7 | 8 | 9 |
|---|---|---|---|---|---|---|---|---|---|
| | DPG[1] | CHA[2] | F[3] | DMF[4] | PEA[5] | Aniline | | TETA[6] | |
| Carrier Liquid Rate, gals./hr | 14 | 14 | 14 | 14 | 14 | 14 | 18 | 14 | 22 |
| Charge Stock:[7] n-paraffin content, Percent | 18 | 18 | 17.7 | 18 | 17.7 | 18 | 17.7 | 17.7 | 18 |
| Raffinate: n-paraffin content, Percent | 17.9 | 18.2 | 17.5 | 18 | 17.8 | 3.5 | 0.5 | 9.2 | 1.4 |
| Desorbent Effluent: Percent of n-paraffin[8] | 18 | 18 | 18 | 18 | 18 | 83 | 95 | 58 | 91 |

Notes:
[1] Dipropylene glycol.
[2] Cyclohexylamine.
[3] Furfural.
[4] Dimethylformamide.
[5] Phenylethanolamine.
[6] Triethylenetetramine.
[7] In runs 1, 2, 4, 6 and 9, n-paraffin, isoparaffin, n-hexane, 2,3-dimethylbutane. In runs 3, 5, 7 and 8, n-paraffin, isoparaffin, n-heptane, iso-octane.
[8] After removal of n-butane; analysis taken after 1 hour of operation, over a 3-hour test period.

On the basis of the above results obtained with various carrier liquids and on the basis of investigating other organic amines which appear to be an effective class of carrier liquids for this purpose, it may be concluded that organic liquids containing oxygen in their molecular composition are undesirable for use as carrier liquids. It is also apparent that of all the structural classes of organic compounds tested, only those compounds containing amino radicals as the sole polar substituent are effective for the indicated purposes. Thus, in addition to aniline, which was the most effective carrier liquid of those tested as indicated above, polyalkylene polyamines such as ethylene diamine, diethylene triamine, triethylene tetraamine and other members of this series, as well as other aromatic amines, such as, metaphenylenediamine and others are also effective as carrier liquids and produced results comparable to those obtained with aniline as indicated in the above experimental results.

We claim as our invention:

1. A process for separating a normal aliphatic hydrocarbon from a mixture of the same with another structural class of hydrocarbon selected from the branched chain and cyclic hydrocarbons which comprises contacting said mixture with a slurry consisting of a metallo-aluminum silicate having the capacity to selectively sorb the normal aliphatic component of said mixture and to reject said other structural class of hydrocarbon while said solid silicate is suspended in a substantially anhydrous liquid organic amine selected from the group consisting of aniline and triethylenetetramine, thereafter withdrawing a raffinate stream comprising said other structural class of hydrocarbon from a liquid slurry comprising said silicate containing sorbed normal aliphatic hydrocarbon suspended in said liquid, organic amine.

2. The process of claim 1 further characterized in that said normal aliphatic hydrocarbon contains at least 4 carbon atoms per molecule.

3. The process of claim 1 further characterized in that said normal aliphatic hydrocarbon is an isomer of the other structural class of hydrocarbon contained in said mixture.

4. The process of claim 1 further characterized in that said liquid slurry comprising said silicate containing sorbed normal aliphatic hydrocarbon is contacted with a normal aliphatic hydrocarbon of different molecular weight than the hydrocarbon sorbed on said silicate in a desorption zone separate from the sorption zone, and the resulting displaced normal aliphatic hydrocarbon initially present in said mixture and sorbed on said silicate during said sorptions is thereafter separately collected.

5. The process of claim 4 further characterized in that said normal aliphatic hydrocarbon of different molecular weight is a hydrocarbon of lower molecular weight than said normal aliphatic hydrocarbon contained in said mixture.

6. The process of claim 5 further characterized in that said normal aliphatic hydrocarbon of lower molecular weight is contacted with said liquid slurry in gaseous phase.

7. The process of claim 5 further characterized in that said liquid slurry is contacted with an amount of said lower molecular weight normal aliphatic hydrocarbon sufficient to substantially displace the normal aliphatic hydrocarbon of said mixture from the sorbent in said slurry and, further, in an amount sufficient to form a separate hydrocarbon stream, and thereafter separating said lower molecular weight normal aliphatic hydrocarbon from the displaced normal aliphatic hydrocarbon derived from said mixture.

8. The process of claim 5 further characterized in that said mixture comprises normal hexane and at least one hydrocarbon selected from the group consisting of cyclohexane, a branched chain aliphatic hexane and benzene and said lower molecular weight normal aliphatic hydrocarbon comprises normal butane.

9. The process of claim 1 further characterized in that said contact is effected at a temperature below the boiling point of said liquid organic amine.

10. The process of claim 1 further characterized in that said contact is effected at a pressure above the vapor pressure of said amine at the temperature of operation.

References Cited in the file of this patent

UNITED STATES PATENTS

| | | |
|---|---|---|
| Re. 23,768 | Cope et al. | Jan. 12, 1954 |
| 2,024,221 | Henderson | Dec. 17, 1935 |
| 2,319,738 | Jones | May 18, 1943 |
| 2,818,455 | Ballard et al. | Dec. 31, 1957 |
| 2,823,765 | Maslan | Feb. 18, 1958 |
| 2,858,901 | Fort | Nov. 4, 1958 |